Patented Feb. 23, 1937

2,071,841

UNITED STATES PATENT OFFICE 2,071,841

COATING PROCESS

Alfred H. Keiling, Chicago, Ill., assignor to International Patents Development Company, Wilmington, Del., a corporation of Delaware No Drawing. Application June 14, 1935, Serial No. 26,578

10 Claims. (Cl. 99—140)

This invention relates to the manufacture of products, more particularly food products, the ingredients of which are intended ultimately to react, for example to bring about effervescence, but in which it is desirable that such reaction be prevented or to a very considerable extent limited or retarded until, by the addition of water, for instance, the intended effect is ready to be produced; and the principal object of the invention is to so treat the ingredients as to prevent their natural reaction until it is desired that the intended effect be produced, or at least to limit or retard such reaction so that, substantially, the effect is not produced before it is desired. The agent used for this purpose is anhydrous dextrose, and the method is to bring about a hydration of the dextrose, with a limited amount of water, in a mixture with one of the reactive ingredients, or, preferably in mixtures with each of the ingredients separately, so that such ingredients are fixed by or incorporated in or coated or isolated by the dextrose which is re-crystallized as the hydrate, in such a manner that such ingredients may be mixed together in a dry state (and with other suitable substances such as flavoring or coloring matters) and kept indefinitely without any substantial reaction until such time as it is desired that the reaction take place.

The invention may be utilized in the manufacture, for example, of effervescent salts consisting of or containing acid and basic substances between which, if mixed together even in a dry state, premature reaction would be likely to take place due, particularly, to atmospheric moisture. The invention may also be utilized in the making of effervescent drinks, in which case a non-reactive compound can be made up and sold to the prospective user, or to the manufacturer or bottler, or to the dispenser of the drink, which compound will remain substantially unaltered indefinitely but can be dissolved to produce the beverage by merely adding water. Anhydrous dextrose is of particular value in this latter connection because of its high purity—it will dissolve to form a very clear transparent solution—and because of its low sweetening power which makes possible the use to the best advantage of delicate flavors. If sweetness is desired, sucrose or an additional amount of dextrose or other sugar can be added for this purpose.

The preferred process for making the effervescent salt (for use as a laxative, for example) is as follows:

The ingredients are; (1) an acid or an acid salt, such for example, as monosodium phosphate ($NaH_2PO_4$); (2) a basic substance of the carbonate, or preferably bicarbonate type, which will react with the acid or acid substance to form a gas, such for example, as bicarbonate of soda ($NaHCO_3$), or bicarbonate of potassium, or the carbonates of lithium, magnesium or calcium; any of which will react with an acid substance to form carbonic acid gas; (3) anhydrous dextrose, and (4) any flavoring, coloring or other suitable substance desired in the product.

*Example 1.*—The ingredients may be used in the following proportions: monosodium phosphate, 8 ounces; sodium bicarbonate, 5 ounces; anhydrous dextrose, not substantially in excess of 13 ounces.

The reactive substances, by which are intended the acid and basic substances, are fixed in, or incorporated in, or coated with, or isolated by the dextrose in any suitable manner, for instance as follows:

A suitable amount of one of the substances, for example, 8 ounces of monosodium phosphate are mixed with 2 ounces of anhydrous dextrose, and the mixture dampened with ⅛ oz. of water, or enough to produce a partial hydration of the dextrose. The product is then mixed with 2 ounces of dextrose, and the mixture dampened as before with the ingredients thoroughly stirred. This is repeated until the sodium phosphate has been thoroughly incorporated in, or coated by the dextrose which is re-crystallized as the hydrate, the crystals or granules of which, if the process be carried far enough, will completely include, cover, isolate and protect the phosphate from reaction with the basic substance forming one of the ultimate ingredients of the compound.

It will be understood that the proportions given above are purely illustrative. In making this particular product the intention is to use as little dextrose as will insure the chemical isolation of the acid and basic substances.

Preferably the other reactive substance is also coated with dextrose hydrate in the same manner. 5 ounces of sodium bicarbonate is mixed with 2 ounces of anhydrous dextrose and moistened with ⅛ ounce of water. The operation is repeated by the addition of more anhydrous dextrose and more water until the sodium bicarbonate is coated with or otherwise isolated by the dextrose which recrystallizes as the hydrate.

The two reactive substances, after the above treatments, may be mixed together and packaged. In use, water is added, whereupon the acid and basic substances react and produce effervescence by generation of carbonic acid gas.

The process of making an effervescent soft drink is similar to the process as above described. The preferred ingredients are: (1) an acid or acid salt, for instance citric or tartaric acid, or both; (2) a basic substance, a carbonate or bicarbonate, preferably bicarbonate of soda, but with the acid substance in excess so that there will be some acid in the drink; (3) anhydrous dextrose; (4) sucrose, or other sugar such as dextrose hydrate, to give the desired sweetness; (5) a fruit flavoring; and (6) coloring matter.

*Example 2.*—The ingredients may be used in the following proportions: citric acid, 1 ounce; tartaric acid, 1 ounce; bicarbonate of soda, ½ ounce to 1 ounce; anhydrous dextrose, 10 ounces; sucrose (cane sugar), 10 ounces; fruit flavors and coloring in the amount customarily used for making soft drinks.

The process of making the compound is as follows:

2 ounces of the acid substance, in the dry state, is mixed with 2 ounces of anhydrous dextrose and the mixture moistened with ⅙ ounce of water. To this is added another 2 ounces of anhydrous dextrose and another ⅙ ounce of water, and this operation repeated until the acid substance is fixed in, coated with or isolated by the hydrated or re-crystallized dextrose. The bicarbonate is treated in the same manner, ½ to one ounce of the bicarbonate of soda being mixed with 2 ounces of anhydrous dextrose and ⅙ ounce of water and the operation repeated until the bicarbonate is thoroughly isolated and coated by the dextrose.

An intimate mixture is made of the acid and basic substances, thus treated, and there is added to this mixture the fruit flavoring and coloring matter with a small amount of water to distribute the color; or the coloring matter and fruit flavor ingredients may be divided and added to the acid and basic substances, separately, after the latter have been re-crystallized with the dextrose.

The above formulas are not to be taken as limitations on the invention. The intention is to cover all modifications of the process within the scope of the appended claims.

I claim:

1. Process which comprises separately mixing anhydrous dextrose with two mutually reactive solid substances and moistening the mixture, in each case, to hydrate the dextrose and incorporate the reactive substances in the granules of the hydrated dextrose.

2. Process which comprises separately and by repeated operations mixing anhydrous dextrose with two mutually reactive solid substances and moistening the mixture, in each case, to hydrate the dextrose and incorporate the reactive substances in the granules of the hydrated dextrose.

3. Process which comprises separately mixing anhydrous dextrose with acid and basic substances and moistening the mixture, in each case, to hydrate the dextrose so that said substances are isolated from each other by the dextrose.

4. Process which comprises separately mixing anhydrous dextrose with an acid and a carbonate or bicarbonate and moistening the mixture, in each case, to hydrate the dextrose so that said substances are isolated from each other by the dextrose.

5. Process which comprises separately mixing anhydrous dextrose with citric or tartaric acid, and with bicarbonate of soda, moistening the mixture, in each case, to hydrate the dextrose so as to substantially prevent reaction between the acid and the bicarbonate.

6. Process which comprises separately mixing anhydrous dextrose with monosodium phosphate and bicarbonate of soda, and moistening the mixture, in each case, to hydrate the dextrose and isolate the acid and basic substances so that they will not react when mixed.

7. Process of treating reactive substances to prevent their reaction when mixed which comprises mixing one of said substances with anhydrous dextrose and hydrating the dextrose.

8. Process of treating an acid and a basic substance to prevent reaction between them when mixed which comprises mixing anhydrous dextrose with one of said substances and moistening the mixture to hydrate the dextrose.

9. Method of making an effervescent salt which comprises separately, and by repeated operations, mixing anhydrous dextrose with an acid phosphate and with a carbonate or bicarbonate; moistening the mixture, in each case, to hydrate the dextrose; and making an intimate dry mixture of the acid and basic substance thus treated with the dextrose.

10. Process of making a compound which, with the addition of water, will form an effervescent drink which comprises mixing anhydrous dextrose separately, and by repeated operations, with an acid and with a carbonate or bicarbonate, with the acid substance in excess; moistening the mixture, in each case, to hydrate the dextrose; and adding to the aforesaid ingredients flavoring and coloring matter to form a dry powder.

ALFRED H. KELLING.